United States Patent [19]

Girrbach et al.

[11] Patent Number: 4,464,838

[45] Date of Patent: Aug. 14, 1984

[54] KNIFE FOR PEELING OF TROPICAL FRUITS

[76] Inventors: Werner Girrbach; Ingrid Girrbach, both of Schönenberger Strasse 22, D-7136 Ötisheim, Fed. Rep. of Germany

[21] Appl. No.: 345,124

[22] Filed: Feb. 2, 1982

[30] Foreign Application Priority Data

Feb. 12, 1981 [DE] Fed. Rep. of Germany ... 8103836[U]

[51] Int. Cl.³ .............................................. A47J 43/28
[52] U.S. Cl. ....................................... 30/149; 30/340; 30/357
[58] Field of Search .......................... 30/346, 355–357, 30/149, 147, 320, 324, 340

[56] References Cited

U.S. PATENT DOCUMENTS

| De. 56,013 | 8/1920 | Lickert | 30/356 X |
| 1,578,827 | 3/1926 | Holsinger | 30/149 X |
| 2,258,448 | 10/1941 | Gesell | 30/356 X |

Primary Examiner—E. R. Kazenske
Assistant Examiner—Douglas D. Watts
Attorney, Agent, or Firm—Martin A. Farber

[57] ABSTRACT

A flat knife, under circumstances made of one metal piece, for the peeling of tropical fruits with a handle, a shank arranged in the plane of the handle and a blade particularly at least approximately planar, the semicircular-shaped edge of which forms a blunt cutter. The blade is deepened flat, dish-shaped with a slightly raised edge, which under circumstances is ground, such that an outer cutting edge is formed.

3 Claims, 5 Drawing Figures

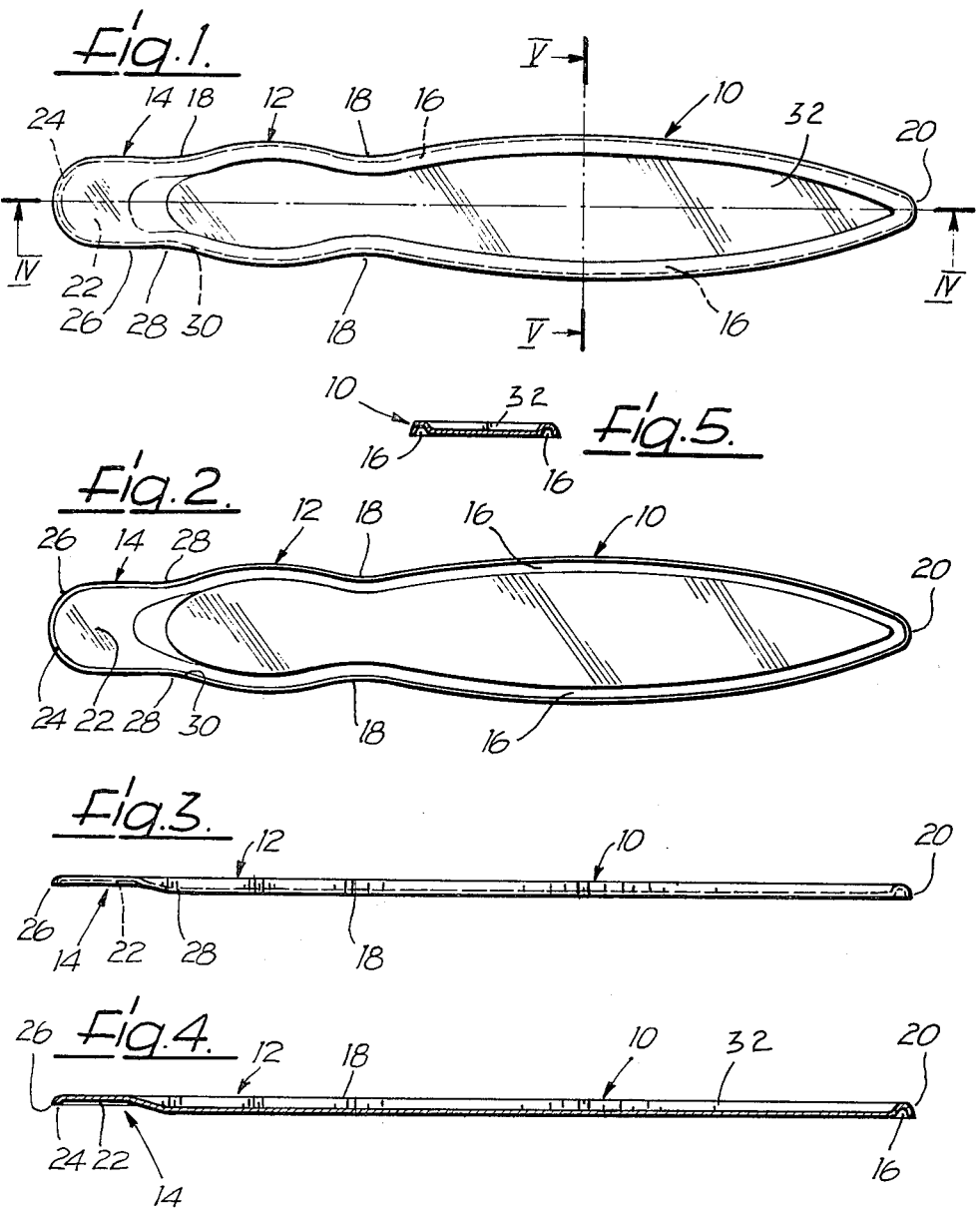

KNIFE FOR PEELING OF TROPICAL FRUITS

The invention relates to a flat knife under circumstances made from one metal piece, for the peeling of tropical fruits; with a handle, a shank arranged in the plane of the handle and a blade, particularly at least approximately planar, whose semicircular-shaped edge forms a blunt cutter.

With one orange-peeler known from the West German GS No. 1 895 739 of this type the plane-parallel blade is inclined at an obtuse angle with respect to the shank, which shank is provided on its wide side which faces away from the point of the blade with a cutting part, by means of the latter a groove can be cut out from an orange peel, whereupon by the blade the peel part which lies between two adjacent grooves can be pulled off from the membrane of the fruit pulp, whereby the thumb of the hand which guides the knife presses the peel part against the blade.

The invention is based on the object to produce a knife for the peels of tropical fruits, which is simple and consequently able to be produced inexpensively as well as effectively usable.

Starting out from a knife of the introductory-mentioned type this objective is solved in accordance with the invention in the manner that the blade is deepened flat, dish-shaped, and its slightly raised edge under the circumstances is polished or ground, so that an outer cutting edge is formed, by means of which it is easy to separate the peel of the fruit in few large pieces smoothly from the membrane of the fruit pulp. This is especially possible with tropical fruits with comparatively easily releasable peels such as mandarins and grapefruits.

With a preferred embodiment of the knife in accordance with the invention, which knife is furnished as the known knife with an indentation as transition from the wider shank to the narrower blade on each narrow side, it is provided that the recess extends on the narrow sides into the shank and the indentations, on the deepened wide side each have a slightly raised, planar ground edge which transfers smoothly into the edge of the blade, so that a continuous outer cutting edge exists extending from the blade into the shank. Practical tests with a knife embodied in this manner have shown that sections or cuttings which fall away on the indentations of the cutting edges during peeling provide a contribution for the release of the peel of the fruit from the membrane of the fruit pulp.

With the preferred embodiment the substantially planar blade is arranged in the plane of the shank and of the handle so that the knife can be produced from a planar blank without bending.

The invention is explained in detail in the following on the basis of the preferred embodiment of the knife in accordance with the invention as illustrated by the drawing by way of example, wherein:

FIG. 1 is a plan view of the upper wide side of the embodiment;

FIG. 2 is a plan view of the bottom wide side of the embodiment;

FIG. 3 is a narrow side of the embodiment;

FIG. 4 is a longitudinal section according to the lines IV—IV in FIG. 1; and

FIG. 5 is a cross-section according to the lines V—V in FIG. 1.

The embodiment comprises a punched-out, embossed steel plate and is consequently flat.

On a handle 10 which is to be gripped by hand there is connected a shank 12 which serves as a thumb plate, and on the shank, a blade 14.

On one wide side of the knife there runs one rigidifying recess 16 each along both edges from the blade 14 up to the end of the handle 10.

On the other wide side of the knife the handle and shank are formed with a flat-bottom central recess 32.

On the two narrow sides of the knife there are located at the transition from the handle 10 to the shank 12 respectively each one indentation 18 in which the index finger of the hand which holds the knife engages.

The free end of the handle 10 runs out into a truncated point 20, from which the two longitudinal edges of the knife extend curved outwardly up to the indentations 18 so that the knife can lie well in the hand.

The blade 14 is similar to a flat dish or a flat spoon or even a spatula and has a flat recess 22 which is edged or bordered by a semi-circularly shaped slightly elevated edge 24 which has obtained an outer cutting edge 26 by plane grinding or sharpening. Furthermore the edge 24 forms a blunt cutter.

At the transition from the wider shank 12 to the narrower blade 14 there is located on each narrow side of the knife an indentation 28 which is rounded-out as the indentations 18 lying behind the branches of the recess 22 in the shank 12, so that also there exists a raised edge 30 on the indentations 28, which edge likewise is ground over. The cutting edge 26 extends consequently over the blade 14 into the handle 10.

The separation of a fruit peel from the membrane of the fruit pulp takes place depending upon the handling of the knife with the left or right hand by means of one or the other half of the cutting edge 26, under the circumstances with assistance of the joining indentation 28.

We claim:

1. In a knife for the peeling of tropical fruits having a handle and a shank arranged in a linear direction in the plane of the handle and a blade particularly at least substantially planar, said blade having a semicircular-shaped edge, and said semicircular-shaped edge forming a blunt cutter, the improvement wherein the blade is deepened flat, dish-shaped, and said edge is a slightly raised edge forming an outer cutting edge, and wherein the blade extends in the linear direction of the handle and shank arrangement, the knife has narrow sides, and the shank is wider than the blade and the knife is formed with indentations as a transition from the wider shank to the narrower blade on each narrow side of the knife, said blade which is deepened flat, dish-shaped and has said slightly raised edge on a deepened wide side of the blade thereby defines a recess, said recess extends adjacent the narrow sides into the shank, and the indentations at the deepened wide side each have a slightly raised, sharpened edge which transfers smoothly into the raised edge of the blade such that a continuous outer cutting edge exists extending from said outer cutting edge of the blade into the shank, the knife has wide sides, and the shank and handle are formed:

with one continuous rigidifying recess on one wide side of said knife constituting a side in common with said deepened wide side of said blade, said rigidifying recess is adjacent and slightly raised, sharpened edge and extends from said first-mentioned recess of the blade adjacent the narrow sides of the knife from said blade to a free end of the handle, and with a central recess on the other wide side.

2. The knife according to claim 1, wherein said narrow sides of said knife form one continuous peripheral edge on said wide side of said knife, said peripheral edge includes said raised edge of the blade and said sharpened edge.

3. The knife according to claim 2, wherein said narrow sides of said knife forming said peripheral edge are substantially narrowest at said blade.

* * * * *